US012218405B2

(12) United States Patent
Ikuma et al.

(10) Patent No.: US 12,218,405 B2
(45) Date of Patent: Feb. 4, 2025

(54) ANTENNA SET

(71) Applicant: AGC Inc., Tokyo (JP)

(72) Inventors: Yoshiyuki Ikuma, Tokyo (JP); Ryuta Sonoda, Tokyo (JP); Yasushi Higashida, Tokyo (JP); Tetsuya Hiramatsu, Tokyo (JP); Kentaro Oka, Tokyo (JP)

(73) Assignee: AGC Inc., Tokyo (JP)

( * ) Notice: Subject to any disclaimer, the term of this patent is extended or adjusted under 35 U.S.C. 154(b) by 110 days.

(21) Appl. No.: 18/154,072

(22) Filed: Jan. 13, 2023

(65) Prior Publication Data

US 2023/0170600 A1 Jun. 1, 2023

Related U.S. Application Data

(63) Continuation of application No. PCT/JP2021/030387, filed on Aug. 19, 2021.

(30) Foreign Application Priority Data

Aug. 20, 2020 (JP) ................................ 2020-139521

(51) Int. Cl.
*H01Q 1/12* (2006.01)
*H01Q 21/24* (2006.01)

(52) U.S. Cl.
CPC ........... *H01Q 1/1271* (2013.01); *H01Q 21/24* (2013.01)

(58) Field of Classification Search
CPC ...... H01Q 1/12; H01Q 1/1271; H01Q 21/065; H01Q 21/24; H01Q 21/28
See application file for complete search history.

(56) References Cited

U.S. PATENT DOCUMENTS

| | | | | |
|---|---|---|---|---|
| 8,892,048 | B1 | 11/2014 | Turner | |
| 2012/0133557 | A1* | 5/2012 | Beaudin | H01Q 9/0435 342/368 |
| 2019/0363763 | A1 | 11/2019 | Frenger et al. | |
| 2020/0021006 | A1 | 1/2020 | Das et al. | |
| 2020/0091990 | A1* | 3/2020 | Ho | H01Q 21/062 |

FOREIGN PATENT DOCUMENTS

| | | | |
|---|---|---|---|
| JP | 2017-38195 | A | 2/2017 |
| JP | 2020-504494 | A | 2/2020 |
| WO | WO 2017/135368 | A1 | 8/2017 |
| WO | WO 2019/107514 | A1 | 6/2019 |
| WO | WO 2020/130902 | A1 | 6/2020 |

OTHER PUBLICATIONS

International Search Report issued Oct. 26, 2021 in PCT/JP2021/030387 filed Aug. 19, 2021, 2 pages.
NTT Docomo, Technical Journal vol. 25, No. 1, 2017, 18 pages.

* cited by examiner

*Primary Examiner* — Hoang V Nguyen
(74) *Attorney, Agent, or Firm* — Oblon, McClelland, Maier & Neustadt, L.L.P.

(57) ABSTRACT

To provide an antenna set capable of forming a communication area which achieves a relatively high throughput. An antenna set comprising a group of antenna units transmitting streams by distributed MIMO,
wherein the group of antenna units has a first antenna unit facing a window glass attached to a building, and a second antenna unit disposed at a distance from the first antenna unit.

30 Claims, 8 Drawing Sheets

ANTENNA SET

TECHNICAL FIELD

The present invention relates to an antenna set.

BACKGROUND ART

Heretofore, wireless communication employing MIMO (Multiple Input Multiple Output) using a plurality of antenna elements has been known (for example, Patent Documents 1 and 2). Further, as a technique to transmit separate streams from a plurality of transmitting locations by MIMO multiplex transmission, distributed MIMO has been known (for example, Non-Patent Document 1).

PRIOR ART DOCUMENTS

Patent Documents

Patent Document 1: WO2017/135368
Patent Document 2: JP-A-2017-38195

Non-Patent Documents

Non-Patent Document 1: NTT DOCOMO Technical Journal Vol. 25, No. 1 (April 2017)

DISCLOSURE OF INVENTION

Technical Problem

However, in distributed MIMO, it is required to install a plurality of antenna units that transmit streams at a certain distance. Accordingly, it is hard to secure an installation position capable of forming a communication area which achieves a relatively high throughput.

The present disclosure provides an antenna set capable of forming a communication area which achieves a relatively high throughput.

Solution to Problem

The present disclosure provides an antenna set comprising a group of antenna units transmitting streams by distributed MIMO, wherein the group of antenna units has a first antenna unit facing a window glass attached to a building, and a second antenna unit disposed at a distance from the first antenna unit.

Advantageous Effects of Invention

According to the present disclosure, it is possible to provide an antenna set capable of forming a communication area which achieves a relatively high throughput.

DESCRIPTION OF EMBODIMENTS

Figure 1:
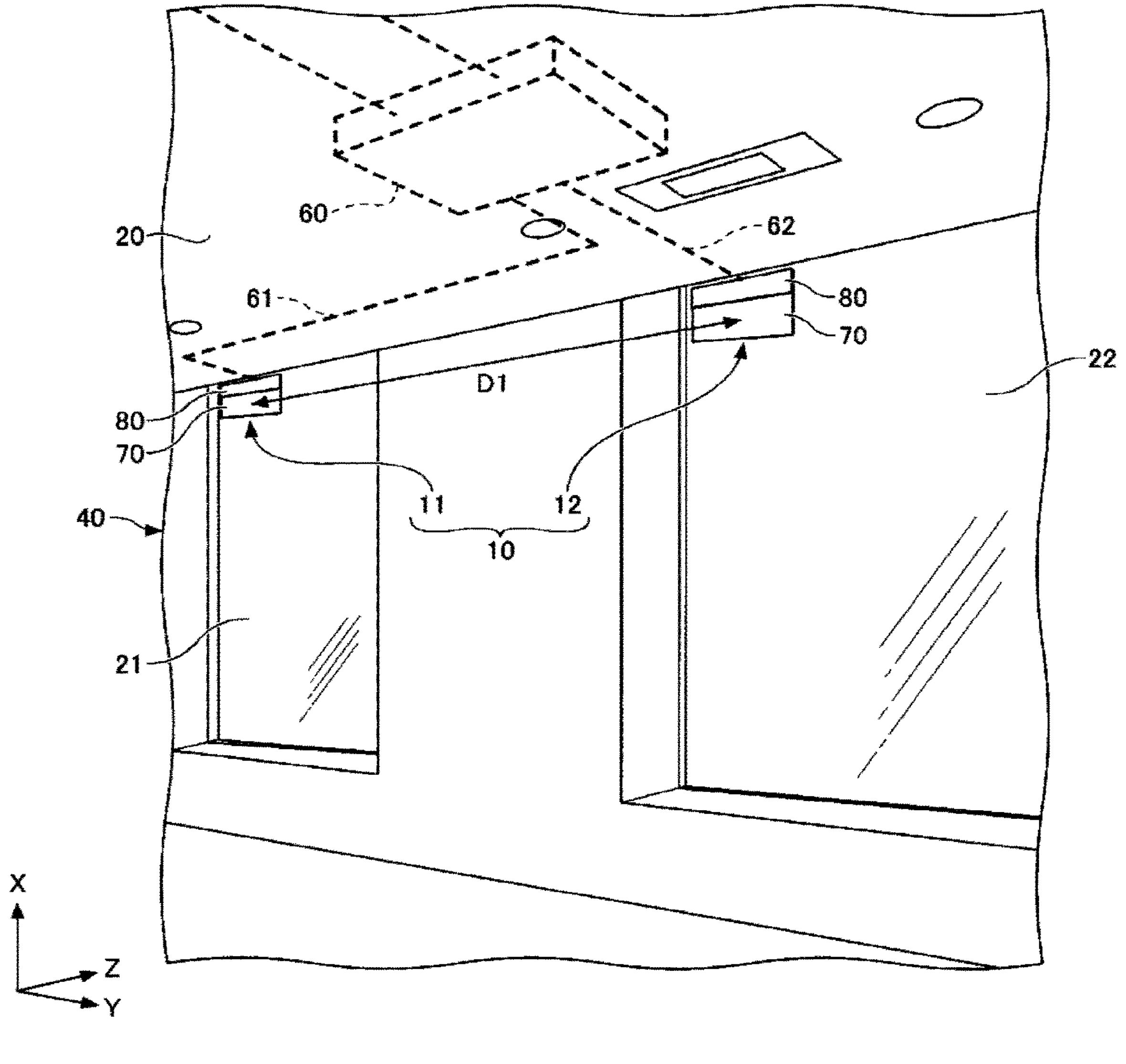
FIG. 1 is a diagram illustrating an example of disposition of an antenna set.

Now, the present embodiment will be described with reference to drawings. For easy understanding, the scales of members in the drawings may sometimes be different from actual ones. In this specification, the three-dimensional rectangular coordinate system in the three-axis directions (X axis direction, Y axis direction, Z axis direction) is employed, where the window glass width direction is the Y axis direction, the window glass thickness direction is the Z axis direction, and the window glass height direction is the X axis direction. The direction from the bottom to the top of the window glass is +X axis direction, and the opposite direction is −X axis direction. In the following description, +X axis direction may sometimes be referred to as upward, and −X axis direction as downward.

The X axis direction, the Y axis direction and the Z axis direction respectively represent a direction in parallel with the X axis, a direction in parallel with the Y axis and a direction in parallel with the Z axis. The X axis direction, the Y axis direction and the Z axis direction are orthogonal to one another. The XY plane, the YZ plane and the ZX plane respectively represent a virtual plane in parallel with the X axis direction and the Y axis direction, a virtual plane in parallel with the Y axis direction and the Z axis direction, and a virtual plane in parallel with the Z axis direction and the X axis direction.

FIG. 1 is a diagram illustrating an example of disposition of an antenna set having a group of antenna units transmitting streams by distributed MIMO. The antenna set 10 shown in FIG. 1 comprises a group of antenna units containing a plurality of antenna units, and FIG. 1 illustrates two antenna units (first antenna unit 11 and second antenna unit 12).

In the example shown in FIG. 1, the first antenna unit 11 is used as installed to face the interior side surface of a window glass 21 of a building 40, and the second antenna unit 12 is used as installed to face the interior side surface of a window glass 22 of the building 40. Hereinafter, the first antenna unit 11 and the second antenna unit 12 may sometimes generally be referred to as antenna units 11, 12.

For example, the Y axis direction and the Z axis direction are substantially in parallel with a direction in parallel with the horizontal plane (horizontal direction), and the X axis direction is substantially in parallel with the vertical direction perpendicular to the horizontal plane.

Window glass such as the window glass 21, 22 is a glass plate to be used for a window of e.g. a building. The window glass if formed, for example, into a rectangular shape as viewed from the front in the Z axis direction, and has a first glass surface and a second glass surface on the opposite side from the first glass surface. The thickness of the window glass is set depending upon the specifications required for e.g. a building. The first glass surface or the second glass surface may sometimes be referred to as a principal surface. In the present embodiment, the rectangular shape includes a rectangle and a square and in addition, a rounded rectangle and a rounded square. The shape of the window glass as viewed from the front is not limited to a rectangular shape and may be other shape such as a circular shape.

The window glass is not limited to a single plate, and may be laminated glass, double glazing, Low-e glass, light control glass or linear member-containing glass. Low-e glass is also called low emission glass, and may be one having a coating layer with heat ray reflecting function (transparent conductive film) coated on a surface to be on the window glass interior side. In such a case, the coating layer may have an opening to suppress a decrease in the electric wave transmission performance. The opening is preferably at a position facing at least a part of the plurality of radiating elements described later. The opening may be formed by patterning. Patterning is to leave the coating layer in a lattice form. Only a part of the opening may be patterned. Further, the linear member-containing glass has a linear member of e.g. a metal in the interior of glass. The linear member may be in a network structure, and the linear member-containing glass is also called wire glass.

The material of the window glass may, for example, be soda lime silica glass, borosilicate glass, aluminosilicate glass or alkali free glass.

The thickness of the window glass is preferably 1.0 to 20 mm. When the thickness is 1.0 mm or more, the window glass has sufficient strength to have the antenna unit attached. Further, when the thickness of the window glass is 20 mm or less, the window glass has good electric wave transmission performance. The thickness of the window glass is more preferably 3.0 to 15 mm, further preferably 9.0 to 13 mm.

In the example shown in FIG. 1, the antenna units 11, 12 are devices used as attached on the interior side of the window glasses 21, 22 for a building, and transmit and receive electric waves in a high frequency band (for example, 0.3 GHz to 300 GHz) such as microwaves including millimeter waves through the window glasses 21, 22. The antenna units 11, 12 are formed to be capable of transmitting and receiving electric waves corresponding to, for example, wireless communication standard such as 5th Generation Mobile Communication System (so-called 5G) or Bluetooth (registered trademark), or wireless LAN (Local Area Network) standard such as IEEE802.11ac. The antenna units 11, 12 may be formed to be capable of transmitting and receiving electric waves corresponding to standards other than the above, or may be formed to be capable of transmitting and receiving electric waves at several different frequencies. The antenna set 10 comprising the antenna units 11, 12 may be utilized, for example, as a wireless base station used to face the window glass.

The antenna set 10 comprises a group of antenna units (in this example, the first antenna unit 11 and the second antenna unit 12) transmitting streams by distributed MIMO. In the distributed MIMO, it is required to install the plurality of antenna units transmitting streams at a certain distance. Accordingly, it is hard to secure an installation position capable of forming a communication area which achieves a relatively high throughput (also called "coverage area"). Electric waves in a high frequency band such as microwaves (particularly millimeter waves) are less likely to propagate far away and has high straightness, and thus it is not easy to design the communication area, and a huge number of wireless base stations may be required.

In the antenna set 10 shown in FIG. 1, the second antenna unit 12 is disposed at a distance from the first antenna unit 11, and each of the antenna units 11, 12 is disposed to face the window glass attached to the building 40. The antenna units 11, 12, which face the window glass attached to the building 40, can transmit beams from a relatively high position toward the ground. Thus, the antenna set 10 can form a communication area which achieves a relatively high throughput, between the antenna set 10 and the ground. Further, the antenna units 11, 12, which face the window glass attached to the building 40, can readily transmit beams avoiding obstacles present between the window glass and the ground. Accordingly, the antenna set 10 can form a communication area which achieves a relatively high throughput, between the antenna set 10 and the ground.

In the example shown in FIG. 1, the antenna units 11, 12 are installed on the interior side of the building 40 than the window glass 21, 22. Thus, installation of the antenna units 11, 12 can be conducted by interior work, and the installation operation can readily be conducted.

In the example shown in FIG. 1, the second antenna unit 12 is disposed at a distance from the first antenna unit 11 in the horizontal direction. Thus, the antenna set 10 can readily enlarge the communication area which achieves a relatively high throughput in the horizontal direction. The embodiment in which the second antenna unit 12 is disposed at a distance from the first antenna unit 11 in the horizontal direction, may, for example, be an embodiment in which each of the antenna units 11, 12 is disposed to cross one virtual plane in parallel with the horizontal plane.

In the example shown in FIG. 1, the second antenna unit 12 is disposed at the same height as the first antenna unit 11. Thus, the communication area formed by beams transmitted from the first antenna unit 11 toward the ground, and the communication area formed by beams transmitted from the second antenna unit 12 toward the ground, can readily be overlapped. Thus, the antenna set 10 can form a communication area which achieves a relatively high throughput. The embodiment in which the second antenna unit 12 is disposed at the same height as the first antenna unit 11, may, for example, be an embodiment in which the distances (heights) from one reference level in parallel with the horizontal plane, to the centers (centers of gravity) of the antenna apertures of the antenna units 11, 12, are the same.

The height of the antenna unit is defined as the height from a certain reference level in parallel with the horizontal plane (for example, the ground, the floor or a virtual surface).

The second antenna unit 12 may be disposed at a height different from the first antenna unit 11. The embodiment in which the second antenna unit 12 is disposed at a height different from the first antenna unit 11, may, for example, be an embodiment in which the distances (heights) from one reference level in parallel with the horizontal plane, to the centers (centers of gravity) of the antenna apertures of the antenna units 11, 12, are different from each other.

In the example shown in FIG. 1, the second antenna unit 12 faces the window glass 22 different from the window glass 21 which the first antenna unit 11 faces. Thus, the first antenna unit 11 and the second antenna unit 12 can readily be disposed at an interval required for distributed MIMO.

So long as the interval required for distributed MIMO can be secured, the second antenna unit 12 may face the window glass 21 which the first antenna unit 11 faces, whereby a wiring 61 connected to the first antenna unit 11 and a wiring 62 connected to the second antenna unit 12 can be disposed close to each other, and thus installation operation for the wirings 61 and 62 can readily be conducted.

As specific examples of the wirings 61 and 62, coaxial cables and optical cables may, for example, be mentioned. The antenna units 11, 12 are connected to a shared base band unit 60 via the wirings 61 and 62. The base band unit 60 is a device which performs communication control to conduct distributed MIMO. The base band unit 60 is installed in the building 40, and in the example shown in FIG. 1, it is installed on the rear side of a ceiling 20 so as to be shielded by the ceiling 20. The base band unit 60 may be installed on the wall or on the floor.

In the example shown in FIG. 1, the second antenna unit 12 is disposed in parallel with the first antenna unit 11. Thus, the communication area formed by beams transmitted from the first antenna unit 11 toward the ground, and the communication area formed by beams transmitted from the second antenna unit 12 toward the ground, can readily be overlapped. Thus, the antenna set 10 can form a communication area which achieves a relatively high throughput. In the example shown in FIG. 1, particularly, the second antenna unit 12 is disposed along the same plane as the first antenna unit 11 (in this example, along one virtual plane in parallel with one wall surface of the building 40), and thus the communication area which achieves a relatively high throughput can more readily be formed.

In the example shown in FIG. 1, the second antenna unit 12 is installed in the building 40 in which the first antenna unit 11 is installed, however, it may be installed in a building different from the building 40 in which the first antenna unit 11 is installed.

Figure 2:
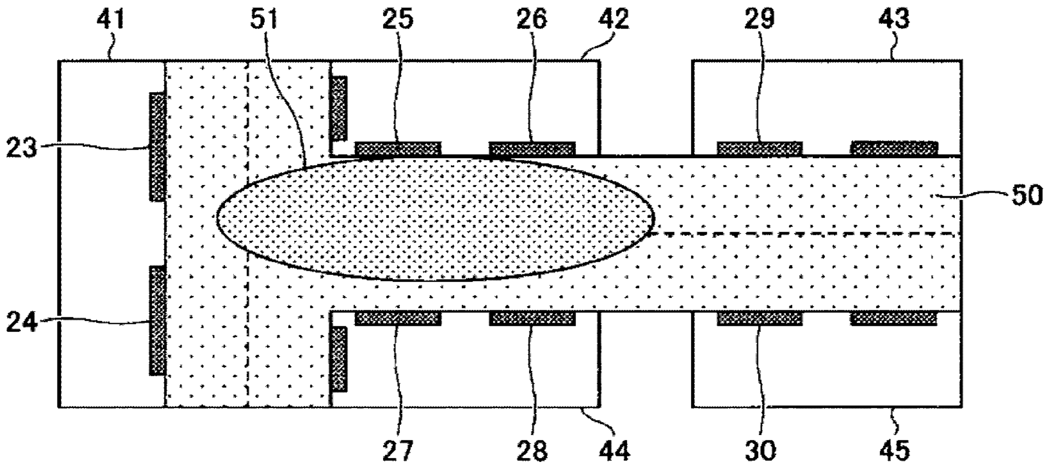
FIG. 2 is a top view schematically illustrating a group of buildings in which an antenna set is installed, as viewed from above.

FIG. 2 is a top view schematically illustrating an example of a group of buildings in which the antenna set is installed as viewed from above. The buildings 41, 42, 43, 44 and 45 stand along the road 50. The building 41 has window glasses 23, 24 facing the road 50. The building 42 has window glasses 25 and 26 facing the road 50. The building 44 has window glasses 27 and 28 facing the road 50. The building 43 has a window glass 29 facing the road 50. The building 45 has a window glass 30 facing the road 50.

The building 42 faces the building 44 across the road 50. The window glasses 25, 26 and 29 respectively face the window glasses 27, 28 and 30 across the road 50.

For example, the first antenna unit 11 may be installed in one of the buildings 41 to 45, and the second antenna unit 12 may be installed in a building different from the building in which the first antenna unit 11 is installed, among the buildings 41 to 45. The above-described base band unit 60 may be installed in the building in which the first antenna unit 11 or the second antenna unit 12 is installed, or may be installed in a position different from the building in which the first antenna unit 11 or the second antenna unit 12 is installed.

For example, the first antenna unit 11 may face one of the window glasses 23 to 30, and the second antenna unit 12 may face a window glass different from the window glass which the first antenna unit 11 faces among the window glasses 23 to 30.

In a case where the second antenna unit 12 is installed in a building different from the building in which the first antenna unit 11 is installed, among the buildings 41 to 45, it may be disposed at a distance from the first antenna unit 11 in the horizontal direction, whereby the antenna set 10 can readily enlarge the communication area which achieves a relatively high throughput in the horizontal direction. For example, the first antenna unit 11 is installed to face the window glass 23 of the building 41, and the second antenna unit 12 is installed in the building 42 at a distance from the first antenna unit 11 in the horizontal direction, whereby the antenna set 10 can readily enlarge the communication area 51 which achieves a relatively high throughput in a horizontal direction. Likewise, for example, the first antenna unit 11 may be installed to face the window glass 25 of the building 42, and the second antenna unit 12 may be installed in the building 43 at a distance from the first antenna unit 11 in a horizontal direction, whereby the antenna set 10 can readily enlarge the communication area 51 which achieves a relatively high throughput in a horizontal direction.

In a case where the second antenna unit 12 is installed in a building different from the building in which the first antenna unit 11 is installed, among the buildings 41 to 45, it may be installed in parallel with the first antenna unit 11, whereby the communication area formed by beams transmitted from the first antenna unit 11 toward the ground, and the communication area formed by beams transmitted from the second antenna unit 12 toward the ground, can readily be overlapped. Thus, the antenna set 10 can form a communication area which achieves a relatively high throughput. For example, the second antenna unit 12 installed in the building 43 may be disposed along the same virtual plane as that of the first antenna unit 11 installed in the building 42, whereby the antenna set 10 can readily form a communication area which achieves a relatively high throughput.

Figure 3:
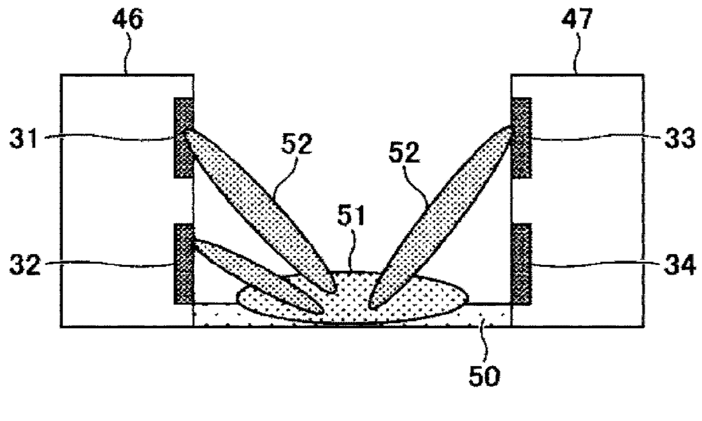
FIG. 3 is a side view schematically illustrating a group of buildings in which an antenna set is installed, as viewed from the side.

FIG. 3 is a side view schematically illustrating an example of a group of buildings in which an antenna set is installed, as viewed from the side. The building 46 faces the building 47 across the road 50. The building 46 has window glasses 31 and 32 attached at different heights, and the building 47 has window glasses 33 and 34 attached at different heights.

For example, the first antenna unit 11 may face one of the window glasses 31 to 34, and the second antenna unit 12 faces a window glass different from the window glass which the first antenna unit 11 faces, among the window glasses 31 to 34, whereby a communication area 51 having a beam 52 transmitted from the first antenna unit 11 and a beam 52 transmitted from the second antenna unit 12 overlapping, as a communication area which achieves a relatively high throughput, can readily be formed on the road 50.

The first antenna unit 11 may be installed to face the window glass 31 or the window glass 32 of the building 46, and the second antenna unit 12 may be installed in the building 47 which faces the building 46, whereby a communication area 51 having a beam 52 transmitted from the first antenna unit 11 and a beam 52 transmitted from the second antenna unit 12 overlapping, as a communication area which achieves a relatively high throughput, can readily be formed on the road 50. The second antenna unit 12 may be installed to face the window glass 33 or the window glass 34 of the building 47.

The first antenna unit 11 may be installed to face the window glass 31, and the second antenna unit 12 may be installed to face the window glass 33 at a distance from the first antenna unit 11 in the horizontal direction, whereby a communication area 51 having a beam 52 transmitted from the first antenna unit 11 and a beam 52 transmitted from the second antenna unit 12 overlapping, as a communication area which achieves a relatively high throughput, can readily be formed on the road 50.

Figure 4:
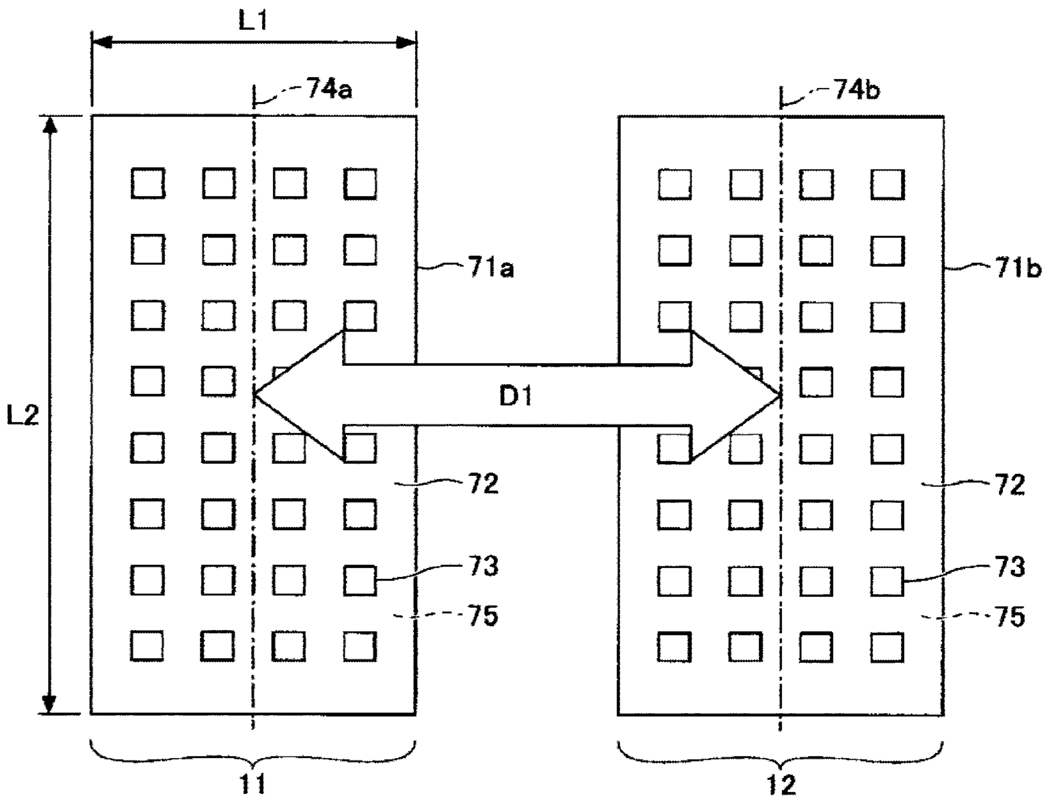
FIG. 4 is a front view illustrating a plurality of antenna units contained in an antenna set, as viewed from the front.

FIG. 4 is a view illustrating a plurality of antenna units contained in an antenna set as viewed from the front. The first antenna unit 11 has a first antenna aperture 71*a*, and the second antenna unit 12 has a second antenna aperture 71*b*. The direction in parallel with the horizontal plane is taken as a first direction, the direction perpendicular to the first direction as a second direction, and a distance from a first center line 74*a* extending in the second direction of the first antenna aperture 71*a* to a second center line 74*b* extending in the second direction of the second antenna aperture 71*b*, as D1. When the distance D1 is more than 1.0 times the antenna aperture width L1 in the first direction of one of the first antenna aperture 71*a* and the second antenna aperture 71*b*, the communication area which achieves a relatively high throughput can be enlarged in the horizontal direction. With a view to enlarging such a communication area in the horizontal direction, the distance D1 is preferably more than 1.5 times the antenna aperture width L1 in the first direction of one of the first antenna aperture 71*a* and the second antenna aperture 71*b*, more preferably more than 2.0 times, further preferably more than 10 times, particularly preferably more than 20 times.

In FIG. 4, the first antenna aperture 71*a* and the second antenna aperture 71*b* respectively have an antenna aperture width L1 in the first direction and an antenna aperture width L2 in the second direction. The antenna aperture width L1 of the first antenna aperture 71*a* may be the same as or different from that of the second antenna aperture 71*b*. The antenna aperture width L2 of the first antenna aperture 71*a* may be the same as or different from that of the second antenna aperture 71*b*.

In a case where the antenna aperture width L1 in the first direction of the first antenna aperture 71*a* is different from that of the second antenna aperture 71*b*, the distance D1 may be more than 1.0 times the antenna aperture width L1 in the first direction of the wider one of the first antenna aperture 71*a* and the second antenna aperture 71*b*, whereby the communication area which achieves a relatively high throughput can be enlarged in the horizontal direction. With a view to enlarging such a communication area in the horizontal direction, the distance D1 is preferably more than 1.5 times the antenna aperture width L1 in the first direction of the winder one of the first antenna aperture 71*a* and the second antenna aperture 71*b*, more preferably more than 2.0 times, further preferably more than 10 times, particularly preferably more than 20 times.

The distance D1 is, in order to secure the throughput and to suppress an increase of the area of installation of the plurality of antenna units at the same time, preferably $10^5$ times or less of the antenna aperture width L1. The distance D1 may be, in order to secure the throughput and to suppress an increase of the area of installation of the plurality of antenna units at the same time, 50 m or less, 30 m or less, or 10 m or less. The distance D1 may be, so as to optimize the maximum throughput, 4 or more and 25 m or less, or 7 m or more and 15 m or less.

FIG. 4 illustrates an embodiment in which the second antenna unit 12 is disposed at the same height as the first antenna unit 11, however, the second antenna unit 12 may be disposed at a height different from the first antenna unit 11. For example, the lower edge of one of the first antenna aperture 71*a* and the second antenna aperture 71*b* may be located above the upper edge of the other antenna aperture. In such a case, the other antenna aperture can transmit beams from a higher position, and thus the communication area which achieves a relatively high throughput can be enlarged in the height direction.

The direction in parallel with the horizontal direction is taken as a first direction, and the direction perpendicular to the first direction as a second direction. In the embodiment in which the second antenna unit 12 is disposed at a height different from the first antenna unit 11, the distance from a first center line extending in the first direction of the first antenna aperture 71*a* to a second center line extending in the first direction of the second antenna aperture 71*b*, as D3. When the distance D3 is more than 1.0 times the antenna aperture width L2 in the second direction of one of the first antenna aperture 71*a* and the second antenna aperture 71*b*, the communication area which achieves a relatively high throughput can be enlarged in the height direction. With a view to enlarging such a communication area in the height direction, the distance D3 is preferably more than 1.5 times the antenna aperture width L2 in the second direction of one of the first antenna aperture 71*a* and the second antenna aperture 71*b*, more preferably more than 2.0 times, further preferably more than 10 times, particularly preferably more than 20 times.

In a case where the antenna aperture width L2 in the second direction of the first antenna aperture 71*a* is different from that of the second antenna aperture 71*b*, the distance D3 may be more than 1.0 times the antenna aperture width L2 in the second direction of the wider one of the first antenna aperture 71*a* and the second antenna aperture 71*b*. In such a case, the communication area which achieves a relatively high throughput can be enlarged in the height direction. With a view to enlarging such a communication area in the height direction, the distance D3 is preferably more than 1.5 times the antenna aperture width L2 in the second direction of the wider one of the first antenna aperture 71*a* and the second antenna aperture 71*b*, more preferably more than 2.0 times, further preferably more than 10 times, particularly preferably more than 20 times.

The distance D3 is, in order to secure the throughput and to suppress an increase of the area of installation of the plurality of antenna units at the same time, preferably $10^5$ times or less of the antenna aperture width L2. The distance D3 may be, in order to secure the throughput and to suppress an increase of the area of installation of the plurality of antenna units at the same time, 50 m or less, 30 m or less, or 10 m or less. The distance D3 may be, so as to optimize the maximum throughput, 4 m or more and 25 m or less, or 7 m or more and 15 m or less.

Figure 5:
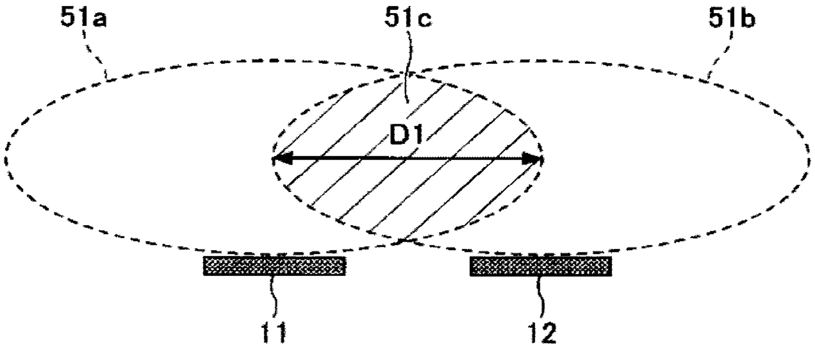
FIG. 5 is a view schematically illustrating a communication area formed by a plurality of antenna units contained in an antenna set.

FIG. 5 is a view schematically illustrating a communication area formed by the plurality of antenna units contained in the antenna set. In the example shown in FIG. 5, the first antenna unit 11 and the second antenna unit 12 are disposed at a distance from each other in the horizontal direction. A communication area 51*a* formed by beams transmitted from the first antenna unit 11, includes a communication area 51*c* overlapping with a communication area 51*b* formed by beams transmitted from the second antenna unit 12. The distance D1 is, for example, a half or less of the length of at least one of the communication area 51*a* and the communication area 51*b* in the horizontal direction, whereby it is possible to secure the throughput and to suppress an increase of the area of installation of the plurality of antenna units at the same time. The communication area is determined, for example, by the transmission power of the wireless circuit 80 shown in FIG. 6 described later, directivity of an array antenna 70, and the receiving sensitivity of the terminal.

In a case where the first antenna unit 11 and the second antenna unit 12 are disposed at a distance from each other in the height direction, the distance D3 may be a half or less of the length of at least one of the communication area 51*a* and the communication area 51*b* in the height direction, whereby it is possible to secure the throughput and to suppress an increase of the area of installation of the plurality of antenna units at the same time.

In FIG. 4, the first antenna unit 11 is a flat antenna having at least one array antenna. The array antenna may, for example, be a microstrip array antenna having a substrate 72 between a plurality of radiating elements 73 disposed on a plane and a conductor 75. The plurality of the radiating elements 73 are contained in the first antenna aperture 71*a* as viewed from the front. When the array antenna has light transmittance, when disposed to face a window glass, the view through the window glass can be secured.

In FIG. 4, the radiating elements 73 are antenna conductors formed to be capable of transmitting and receiving electric waves in a desired frequency band. The desired frequency band may, for example, be UHF (Ultra High Frequency) band at a frequency of from 0.3 to 3 GHz, SHF (Super High Frequency) band at a frequency of from 3 to 30 GHz, or EHF (Extremely High Frequency) band at a frequency of from 30 to 300 GHz. The radiating elements 73 function as a radiator.

The radiating elements 73 are provided on a first principal surface on the exterior side of the substrate 72. The radiating elements 73 may be formed by printing a metal material so as to overlap with a ceramic layer provided on the first principal surface of the substrate 72 at least partly. In such a case, the radiating elements 73 are formed to cover a portion where a ceramic layer is formed and other portion on the first principal surface of the substrate 72.

The radiating elements 73 are, for example, flat-formed conductors. As a metal material forming the radiating elements 73, a conductive material such as gold, silver, copper, aluminum, chromium, lead, zinc, nickel or platinum may be used. The conductive material may be an alloy, such as an alloy of copper and zinc (brass), an alloy of silver and copper, or an alloy of silver and aluminum. The radiating elements 73 may be in the form of a thin film. The shape of the radiating elements 73 may be rectangular or circular, and is not limited thereto.

As another material forming the radiating elements 73, a fluorine-doped tin oxide (FTO) or indium tin oxide (ITO) may, for example, be mentioned.

The above ceramic layer may be formed on the first principal surface of the substrate 72 e.g. by printing. By providing the ceramic layer, wirings (not shown) attached to the radiating elements 73 can be covered, thus leading to favorable design property. In the present embodiment, the ceramic layer may not be provided on the first principal surface, and may be provided on a second principal surface on the interior side of the substrate 72. It is preferred to provide the ceramic layer on the first principal surface of the substrate 72, in that the radiating elements 73 and the ceramic layer can be provided on the substrate 72 by printing in the same process.

The material of the ceramic layer may, for example, be glass frit, and its thickness is preferably from 1 to 20 μm.

In the present embodiment, the radiating elements 73 are provided on the first principal surface of the substrate 72, but may be provided in the interior of the substrate 72. In such a case, the radiating elements 73 may be provided in the interior of the substrate 72 for example in a coil shape.

In a case where the substrate 72 is a laminated glass having a pair of glass plates and a resin layer provided between the pair of glass plates, the radiating elements 73 may be provided between the glass plate and the resin layer constituting the laminated glass.

Otherwise, the radiating elements 73 themselves may be formed in a flat plate shape. In such a case, the radiating elements 73 in a flat plate shape may directly be attached to a supporting portion without using the substrate 72.

The radiating elements 73 may be provided in a container, not provided on the substrate 72. In such a case, the radiating elements 73 in a flat plate shape may be provided in the container. The shape of the container is not limited and may be rectangular. The substrate 72 may constitute a part of the container.

The radiating elements 73 preferably has light transparency. When the radiating elements 73 has light transparency, favorable design property will be obtained, and the average solar absorption rate can be decreased. The visible light transmittance of the radiating elements 73 is preferably 40% or more, and is preferably 60% or more with a view to maintaining the function as a window glass in view of transparency. The visible light transmittance may be obtained in accordance with JIS R3106 (1998).

The radiating elements 73 are formed preferably in a mesh to achieve light transparency. The mesh means a state where a plane of the radiating elements 73 has through-holes in a network structure.

In a case where the radiating elements 73 are formed in a mesh, the shape of the through-holes may be square or rhomboidal. The line width of the mesh is preferably from 0.1 to 30 μm, more preferably from 0.2 to 15 μm. The line interval of the mesh is preferably from 5 to 500 μm, more preferably from 10 to 300 μm. Where $\lambda_0$ is the wavelength in the air of electric waves emitted from the radiating elements 73, the line width of the mesh is preferably $(1/5000)\times\lambda_0$ to $(1/1333)\times\lambda_0$, and the line interval of the mesh is preferably $(1/72)\times\lambda_0$ to $(1/36)\times\lambda_0$.

The open area ratio of the radiating elements 73 is preferably 80% or more, more preferably 90% or more. The open area ratio of the radiating elements 73 is the proportion of the area of the openings to the total area of the radiating elements 73 including the openings formed on the radiating elements 73. The larger the open area ratio of the radiating elements 73 is, the higher the visible light transmittance of the radiating elements 73 is.

The thickness of the radiating elements 73 is preferably 400 nm or less, more preferably 300 nm or less. The lower limit of the thickness of the radiating elements 73 is not particularly limited and may be 2 nm or more, may be 10 nm or more, or may be 30 nm or more.

Further, in a case where the radiating elements 73 are formed in a mesh, the thickness of the radiating elements 73 may be from 2 to 40 μm. When the radiating elements 73 are formed in a mesh, the visible light transmittance can be made high even though the radiating elements 73 are thick.

The substrate 72 is a substrate provided for example in parallel with the window glass. The substrate 72 is formed for example in a rectangular shape as viewed two-dimensionally, and has a first principal surface and a second principal surface. The first principal surface of the substrate 72 faces the exterior side, and in the first embodiment, disposed to face the interior side surface of the window glass. The second principal surface of the substrate 72 is disposed to face the interior side, and in the first embodiment, disposed to face in the same direction as the interior side surface of the window glass.

The substrate 72 may be disposed to have a predetermined angle to the window glass. The antenna unit may emit electromagnetic waves in a state where (the normal direction of) the substrate 72 on which the radiating elements 73 are installed is inclined relative to (the normal direction of) the window glass in some cases.

The material forming the substrate 72 is designed in accordance with the antenna performance such as the power and directivity required for the radiating elements 73, and for example, a dielectric such as glass or a resin, a metal, or a composite thereof, may be used. The substrate 72 may be formed of a dielectric such as a resin so as to have light transparency. By forming the substrate 72 by a material having light transparency, it is possible to reduce blocking of the field of view viewed through the window glass by the substrate 72.

When glass is used for the substrate 72, as the material of glass, for example, soda lime silica glass, borosilicate glass, aluminosilicate glass, quartz glass or alkali free glass may be mentioned.

The glass plate used as the substrate 72 may be produced by a known production method such as float process, fusion method, redraw method, press forming or pulling method. As a method for producing the glass plate, in view of excellent productivity and cost, float process is preferred.

The glass plate is formed into a rectangular shape as viewed two-dimensionally. As a method of cutting the glass plate, for example, a method of applying laser beam to the surface of the glass plate and moving the laser beam irradiation region on the surface of the glass plate, or a mechanical cutting method e.g. by a cutter wheel, may be mentioned.

In the present embodiment, the rectangular shape includes a rectangle and a square and in addition, a rounded rectangle and a rounded square. The shape of the glass plate as viewed two-dimensionally is not limited to a rectangular shape and may be a circular shape or the like. Further, the glass plate is not limited to a single plate, and may be laminated glass or double grazing.

In a case where a resin is used for the substrate 72, the resin is preferably a transparent resin, and may, for example, be polyethylene terephthalate, polyethylene, liquid crystal polymer (LCP), polyimide (PI), polyphenylene ether (PPE), polycarbonate, an acrylic resin or a fluororesin. In view of low dielectric constant, a fluororesin is preferred.

The fluororesin may, for example, be an ethylene/tetrafluoroethylene copolymer (hereinafter sometimes referred to as "ETFE"), a hexafluoropropylene/tetrafluoroethylene copolymer (hereinafter sometimes referred to as "FEP"), a tetrafluoroethylene/propylene copolymer, a tetrafluoroethylene/hexafluoropropylene/propylene copolymer, a perfluoro (alkyl vinyl ether)/tetrafluoroethylene copolymer (hereinafter sometimes referred to as "PEA"), a tetrafluoroethylene/hexafluoropropylene/vinylidene fluoride copolymer (hereinafter sometimes referred to as "THV"), a polyvinylidene fluoride (hereinafter sometimes referred to as "PVDF"), a vinylidene fluoride/hexafluoropropylene copolymer, a polyvinyl fluoride, a chlorotrifluoroethylene polymer, an ethylene/chlorotrifluoroethylene copolymer (hereinafter sometimes referred to as "ECTFE") or a polytetrafluoroethylene. They may be used alone or in combination of two or more.

The fluororesin is preferably at least one member selected from the group consisting of ETFE, FEP, PFA, PVDF, ECTFE and THV, and in view of excellent transparency, processability and weather resistance, particularly preferably ETFE.

As the fluororesin, AFLEX (registered trademark) may also be used.

The thickness h of the substrate 72 is preferably from 25 μm to 10 mm. The thickness h of the substrate 72 may optionally be set depending upon the position at which the radiating elements 73 are disposed.

In a case where the substrate 72 is made of a resin, the resin is preferably used as formed into a film or a sheet. The thickness h of the film or the sheet is, in view of excellent strength to hold the antenna, preferably from 25 to 1000 μm, more preferably from 100 to 800 μm, particularly preferably from 100 to 500 μm.

In a case where the substrate 72 is made of glass, the thickness h of the substrate 72 is preferably from 0.5 to 10 mm in view of strength to hold the antenna.

The arithmetic mean roughness Ra of the first principal surface on the exterior side of the substrate 72 is preferably 1.2 μm or less, because, when the arithmetic mean roughness Ra of the first principal surface is 1.2 μm or less, air is likely to flow in a space formed between the substrate 72 and the window glass. The arithmetic mean roughness Ra of the first principal surface is more preferably 0.6 μm or less, further preferably 0.3 μm or less. The lower limit of the arithmetic mean roughness Ra is not particularly limited and may, for example, be 0.001 μm or more.

The arithmetic mean roughness Ra may be measured in accordance with Japanese Industrial Standards JIS B0601: 2001.

The area of the substrate 72 is preferably from 0.01 to 4 $m^2$. When the area of the substrate 72 is 0.01 $m^2$ or more, the radiating elements 73, the conductor 75 and the like are likely to be formed. Further, when it is 4 $m^2$ or less, the antenna unit is less likely to be noticeable in the appearance and favorable design property will be obtained. The area of the substrate 72 is more preferably from 0.05 to 2 $m^2$.

The conductor 75 may be formed on the second principal surface on the opposite side of the substrate 72 from the window glass side. The conductor 75 is provided on the interior side relative to the radiating elements 73. The conductor 75 may be a portion which functions as an electromagnetic wave shielding layer which can reduce electromagnetic wave interference between electromagnetic waves emitted from the radiating elements 73 and electromagnetic waves generated from electronic devices in the room. The conductor 75 may be a single layer or may be a multilayer. For the conductor 75, a known material may be used. For example, a metal film of copper or tungsten, or a transparent substrate using a transparent conducive film may be used.

For the transparent conductive film, for example, a light transparent conductive material such as indium tin oxide (ITO), fluorine-doped tin oxide (FTO), indium zinc oxide (IZO), silicon oxide-doped indium tin oxide (ITSO), zinc oxide (ZnO), or a Si compound containing P or B may be used.

The conductor 75 is, for example, a conductor plane formed in a flat plate shape. The shape of the conductor 75 may be rectangular or circular, and is not limited to such a shape.

The conductor 75 is formed preferably in a mesh so as to have light transparency. The mesh means a state where a plane of the conductor 75 has through-holes in a network structure. In a case where the conductor 75 is formed in a mesh, the shape of the through-holes may be square or rhomboidal. The line width of the mesh is preferably from 0.1 to 30 μm, more preferably from 0.2 to 15 μm. The line interval of the mesh is preferably from 5 to 500 μm, more preferably from 10 to 300 μm.

As a method of forming the conductor 75, a known method may be employed, and for example, a sputtering method or a deposition method may be employed.

The surface resistivity of the conductor 75 is preferably 20 Ω/square or less, more preferably 10 Ω/square or less, further preferably 5 Ω/square or less. The conductor 75 is preferably larger than the substrate 72, but may be narrower than the substrate 72. By providing the conductor 75 on the second principal surface side on the interior side of the substrate 72, transmission of electric waves to the interior can be suppressed. The surface resistivity of the conductor 75 depends on the thickness, the material and the open area ratio of the conductor 75. The open area ratio is the proportion of the area of the openings to the total area of the conductor 75 including the openings formed on the conductor 75.

The visible light transmittance of the conductor 75 is, with a view to improving design property, preferably 40% or more, more preferably 60% or more. Further, the visible light transmittance of the conductor 75 is, with a view to suppressing transmission of electric waves into the room, preferably 90% or less more preferably 80% or less.

The higher the open area ratio of the conductor 75, the higher the visible light transmittance. The open area ratio of the conductor 75 is preferably 80% or more, more preferably 90% or more. The open area ratio of the conductor 75 is preferably 95% or less so as to suppress transmission of electric waves into the room.

The thickness of the conductor 75 is preferably 400 nm or less, more preferably 300 nm or less. The lower limit of the thickness of the conductor 75 is not particularly limited and may be 2 nm or more, may be 10 nm or more, or may be 30 nm or more.

In a case where the conductor 75 is formed into a mesh, the thickness of the conductor 75 may be from 2 to 40 μm. When the conductor 75 is formed into a mesh, the visible light transmittance can be made high even if the conductor 75 is thick.

The radiating elements 73 are patch element (patch antennas), but may be other elements such as dipole elements (dipole antennas) or slot elements (slot antennas).

The shape of the second antenna unit 12 may be the same as the first antenna unit 11, and thus description of the shape of the first antenna unit 11 is incorporated to describe the shape of the second antenna unit 12.

Figure 6:
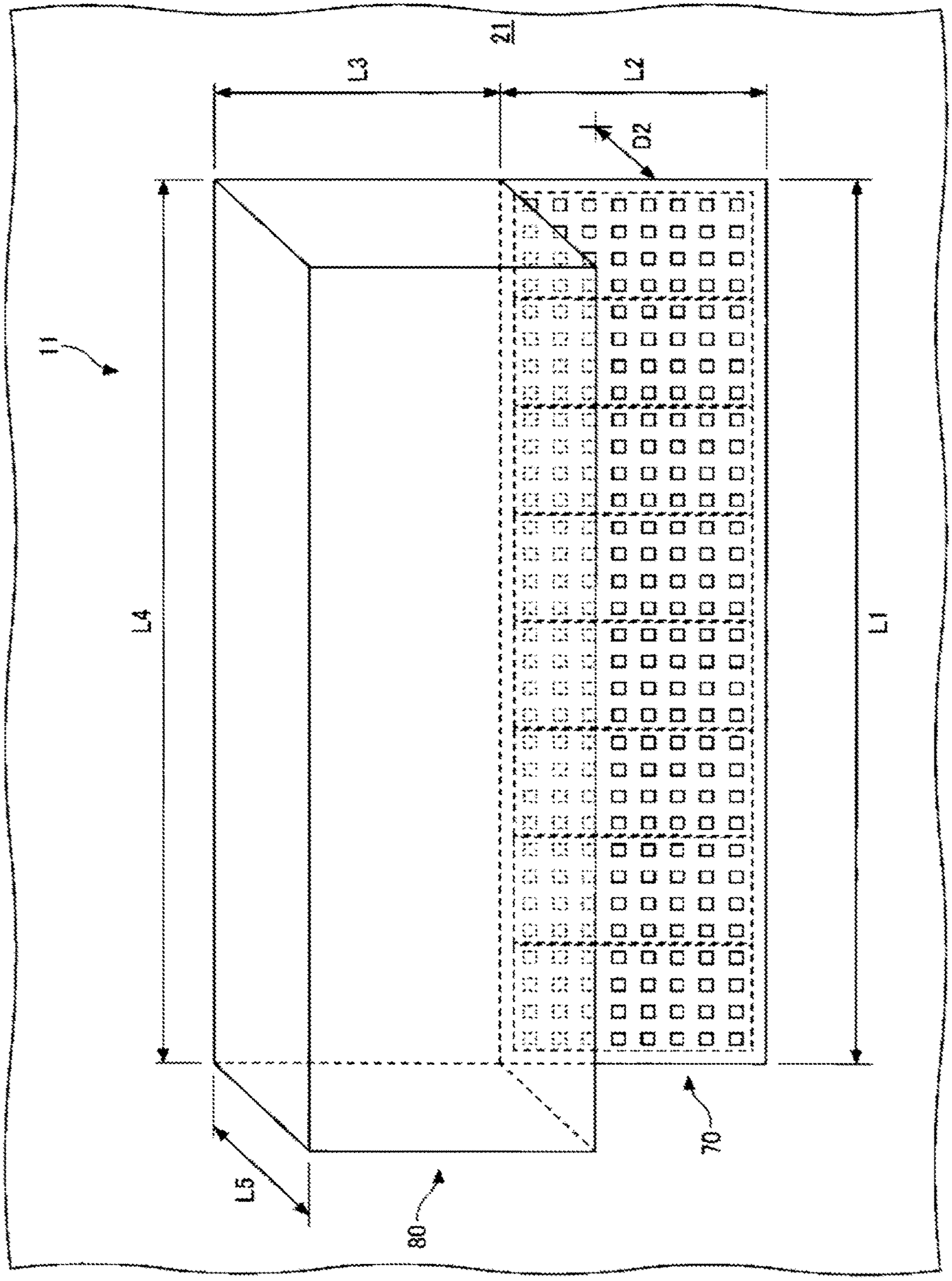
FIG. 6 is a perspective view illustrating an example of constitution of an antenna unit.

FIG. 6 is a perspective view illustrating an example of constitution of an antenna unit. The first antenna unit 11 has, for example, a wireless circuit 80, and one or more array antennas 70 connected to the wireless circuit 80. The wireless circuit 80 has amplifiers to amplify signals. The above described base band unit 60 is connected to the array antennas 70 via the wireless circuit 80.

When the distance D2 from the first antenna unit 11 to the window glass 21 is 3 mm or more and 10 mm or less, a protrusion of the first antenna unit 11 from the window glass 21 is suppressed, and thus the first antenna unit 11 will readily be installed. When the distance D2 is 3 mm or more, heat dissipation property will be high, and thus the array antennas 70 are less likely to be broken by heat. When the distance D2 is 5 mm or more, the heat dissipation property of the antenna unit will be further higher. When the distance D2 is 10 mm or less, the decrease of the intensity of beams emitted through the window glass 21 can be suppressed. When the distance D2 is 8 mm or less, the decrease of the intensity of beams emitted through the window glass 21 can further be suppressed. Further, where the wavelength of the radiating elements 73 at the operation frequency is $\lambda g$, the distance D2 may be 0.28 $\lambda g$ or more and 0.93 $\lambda g$ or less.

The first antenna unit 11 may have, as shown in FIG. 6, one or more array antennas 70 disposed in a region not overlapping with the wireless circuit 80 as viewed from the front, whereby the decrease of the intensity of beams emitted from the one or more array antennas 70 through the window glass 21 can be suppressed. The first antenna unit 11 may have one or more array antennas 70 disposed between the wireless circuit 80 and the window glass 21. Since the one or more array antennas 70 are shielded by the wireless circuit 80, the design property will improve.

Now, examples of throughputs calculated by simulation will be described.

TABLE 1

| Parameters | | Set values |
|---|---|---|
| Base station | Antenna | 4 × 8 element |
| | Antenna disposition | Integrated, distributed (7 m, 10 m interval) |
| | Height | 10 m |
| Terminal | Antenna | Isotropic horizontal/vertical polarization |
| | Terminal disposition | 1 m mesh<br>Antennas disposed at two points at λ/2 interval from each mesh center (two types of horizontal/vertical polarization antennas disposed at one point) |
| | Height | 1 m |
| Antenna constitution | | 4 × 4 MIMO or 2 × 2 MIMO (one with higher TP selected) |
| Total transmission power | | 25 dBm (19 dBm per layer) |
| Band width | | 200 MHz |
| NF | | 9 dB |
| Tilt angle | | −25° |
| Beam forming | | 0°, ±30°, ±45°, ±60° |
| Path analysis means | | Ray-Launching (six reflections, one diffraction) |
| Concrete electric constant | | ITU-R (relative dielectric constant: 5.31, conductivity: 0.4838) |

Table 1 illustrates simulation conditions to calculate throughputs by simulation. Simulation was conducted at an antenna operation frequency of 28 GHz.

TABLE 2

| Parameters | Set values |
|---|---|
| Array constitution | 4 × 8 element |
| Polarization | Horizontal/vertical polarization |
| Antenna height | 10 m (terminal height: 1 m, difference of elevation: 9 m) |
| Tilt | Electric tilt |
| Tilt angle | Angle of elevation −25/−40° |
| Window glass thickness | 18.8 mm |
| Window glass size | Size 300 mm × 300 mm |
| Distance between window glass and antenna | 5 mm |

TABLE 2-continued

| Parameters | Set values |
|---|---|
| Window glass material | Soda lime silica glass |
| Antenna substrate material | Soda lime silica glass |
| Antenna gain | Maximum 17.3 dBi |

Table 2 illustrates the constitution of the antenna unit to calculate throughputs by simulation. The first antenna unit 11 has the same constitution as the second antenna unit 12.

Figure 7:
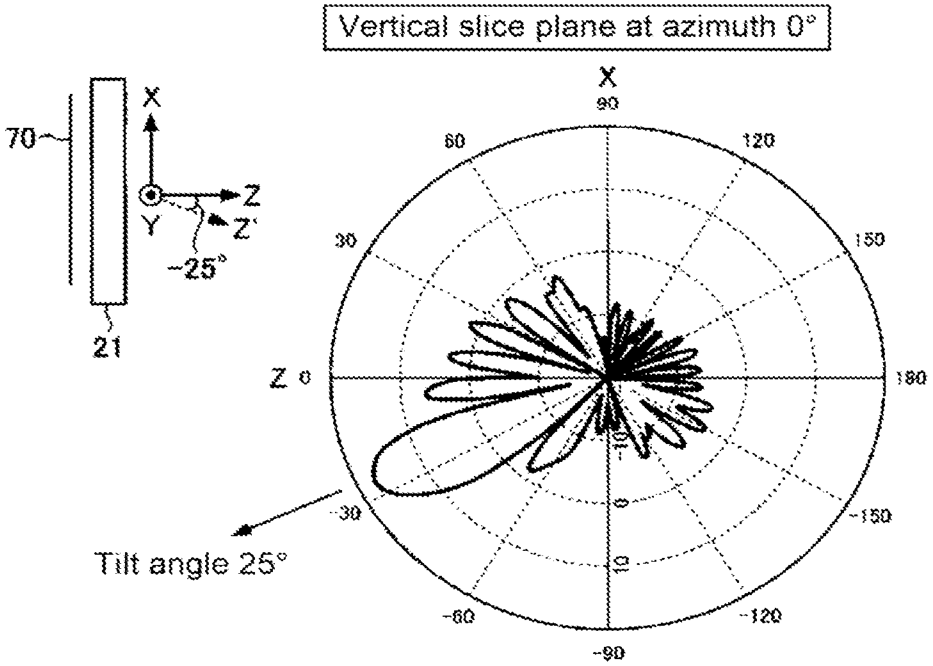
FIG. 7 is a diagram illustrating an example of the directivity of an antenna unit in a vertical plane (ZX plane) at an azimuth of 0° in a case where beams are emitted at a tilt angle to YZ plane of 25° at an azimuth to ZX plane of 0°.
Figure 8:
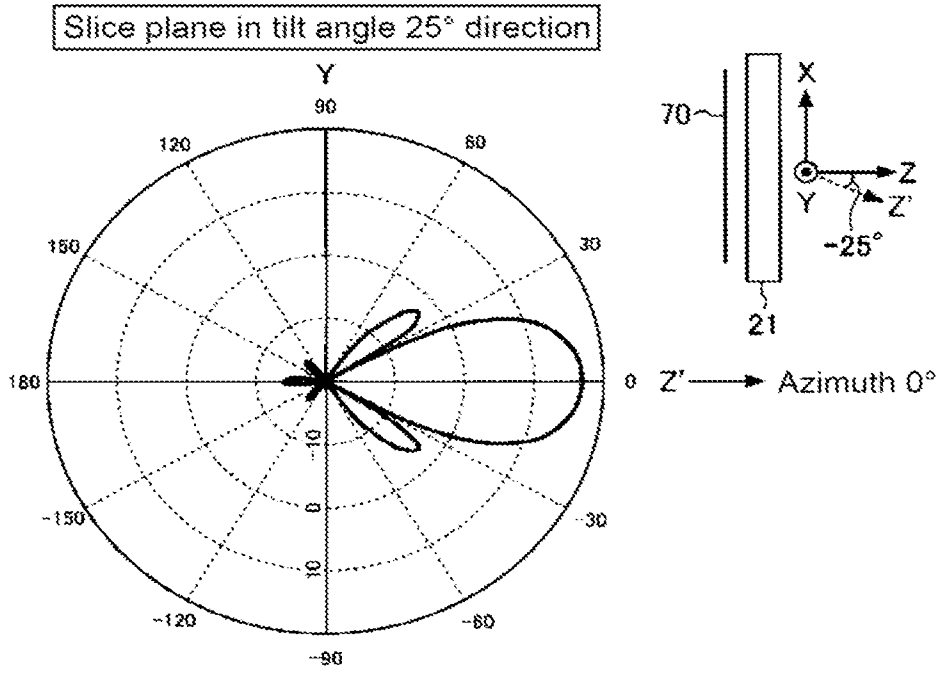
FIG. 8 is a diagram illustrating an example of the directivity of an antenna unit in a slice plane in the tilt angle 25° direction in a case where beams are emitted at a tilt angle to YZ plane of 25° at an azimuth to ZX plane of 0°.
Figure 9:
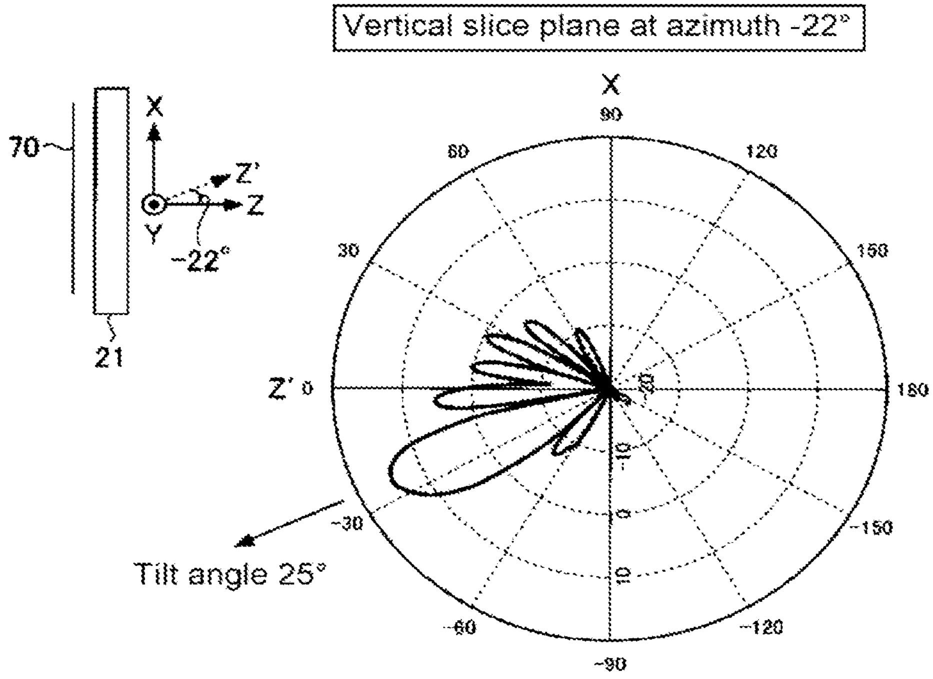
FIG. 9 is a diagram illustrating an example of the directivity of an antenna unit in a vertical plane at an azimuth of −22° in a case where beams are emitted at a tilt angle to YZ plane of 25° at an azimuth to ZX plane of −22°.
Figure 10:
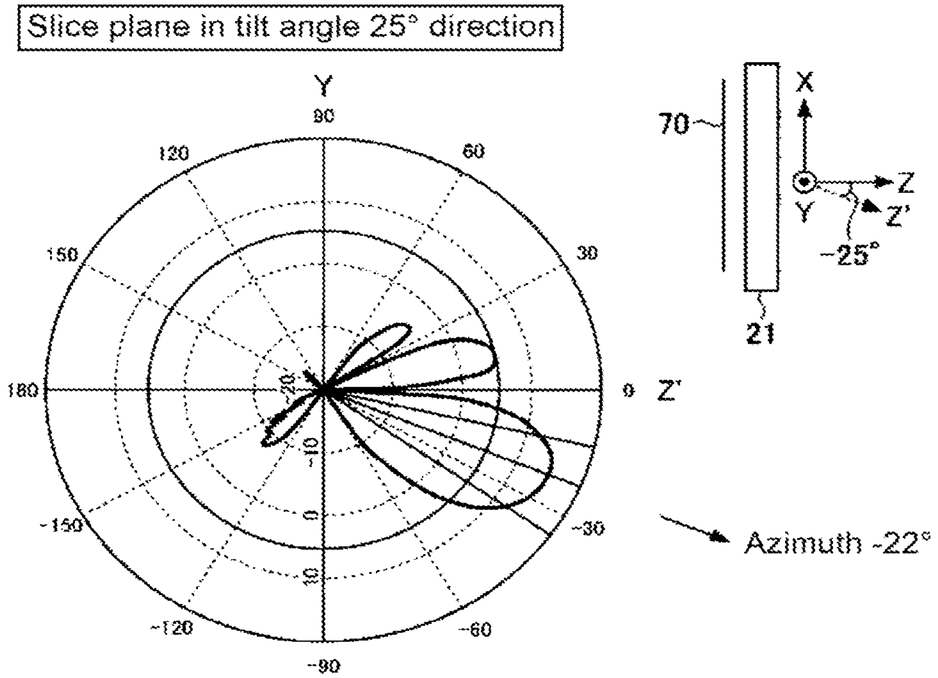
FIG. 10 is a diagram illustrating an example of the directivity of an antenna unit in a slice plane in the tilt angle 25° direction in a case where beams are emitted at a tilt angle to YZ plane of 25° at an azimuth to ZX plane of −22°.

FIG. 7 is a diagram illustrating an example of the directivity of an antenna unit in a vertical plane (ZX plane) at an azimuth of 0° in a case where beams are emitted at a tilt angle to YZ plane of 25° at an azimuth to ZX plane of 0°. FIG. 8 is a diagram illustrating an example of the directivity of an antenna unit in a slice plane in the tilt angle 25° direction in a case where beams are emitted at a tilt angle to YZ plane of 25° at an azimuth to ZX plane of 0°. FIG. 9 is a diagram illustrating an example of the directivity of an antenna unit in a vertical plane at an azimuth of −22° in a case where beams are emitted at a tilt angle to YZ plane of 25° at an azimuth to ZX plane of −22°. FIG. 10 is a diagram illustrating an example of the directivity of an antenna unit in a slice plane in the tilt angle 25° direction in a case where beams are emitted at a tilt angle to YZ plane of 25° at an azimuth to ZX plane of −22°.

Figure 11:
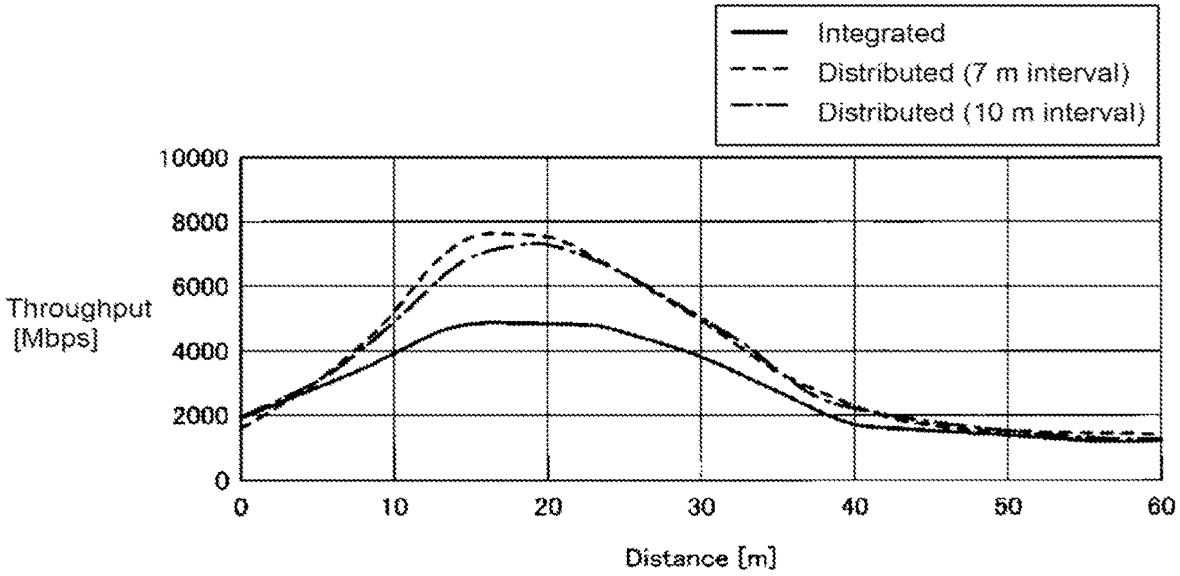
FIG. 11 is a diagram illustrating an example of throughputs calculated by simulation.

FIG. 11 is a diagram illustrating an example of throughputs calculated by simulation. In the simulation, the antenna on the receiver side is an isotropic antenna, and the antenna gain is 0 dBi. The "integrated" means a case where the interval between the first antenna unit 11 and the second antenna unit 12 is 0, and the respective units transmit the same beam. The "distributed (7 m interval)" mean that the interval between the first antenna unit 11 and the second antenna unit 12 is 7 m, and independent beams are transmitted from the first antenna unit 11 and the second antenna unit 12 by distributed MIMO. The "distributed (10 m interval)" means that the interval between the first antenna unit 11 and the second antenna unit 12 is 10 m, and independent beams are transmitted from the first antenna unit 11 and the second antenna unit 12 by distributed MIMO. In FIG. 11, the horizontal axis represents the distance from the first antenna unit 11, and the vertical axis represents the throughput.

As shown in FIG. 11, by the distributed system, a communication area which achieves a high throughput can be formed as compared with by the integrated system.

The antenna set is described above with reference to the embodiments, however, the present invention is not limited to such embodiments. Various changes and modifications including combinations with a part or the whole of other embodiments and replacement are possible within the scope of the present invention.

For example, the antenna unit may not be fixed to the window glass. The antenna unit may be hung from the ceiling, or may be fixed to a protrusion present near the window glass (for example, a window frame or a window sash holding the outer edge of the window glass), so that the antenna unit is used as installed to face the window glass. The antenna unit may be installed to be in contact with the window glass or may be installed adjacent to the window glass without being in contact.

Further, disposition of the antenna unit is not limited to a case where it is disposed on the interior side so as to face the interior side surface of the window glass, and may be a case where it is disposed on the exterior side to face the exterior side surface of the window glass.

Further, the second antenna unit may be installed to a structure fixed on the ground, so long as it is disposed at a distance from the first antenna unit facing the window glass attached to a building. For example, the second antenna unit may be installed on the roof or on the wall of a building, or may be installed on a structure such as a bridge, a tower, a streetlight, a signal, a utility pole or a fence.

Further, the antenna set may have three or more antenna units transmitting streams by distributed MIMO. By having three or more antenna units, a communication area which achieves a higher throughput can be formed. Further, the capacity in the communication area can be increased.

Figure 12:
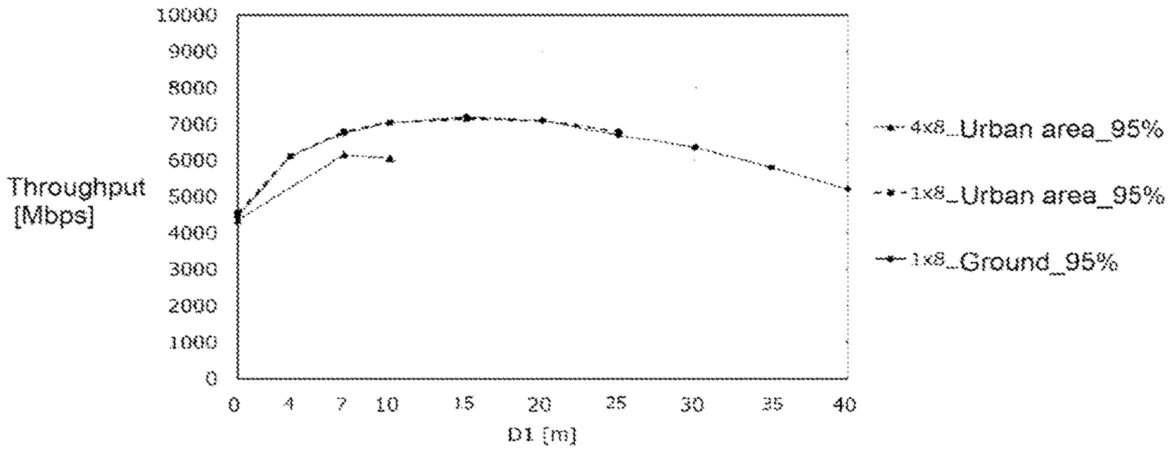
FIG. 12 is a diagram illustrating an example of throughputs calculated by simulation.

FIG. 12 is a diagram illustrating an example of throughputs calculate by simulation. The simulation illustrates a case where independent beams (frequency: 28 GHz) are transmitted from a first antenna unit 11 (1×8 element or 4×8 element) and a second antenna unit 12 (1×8 element or 4×8 element) by distributed MIMO. The first antenna unit 11 is one having the same structure as the second antenna unit 12.

The distance D1 from the first center line **74*a* of the first antenna aperture (aperture width L1: 21.4 mm, L2: 42.8 mm) to the second center line 74*b*** of the second antenna aperture (aperture width L1: 21.4 mm, L2: 42.8 mm) was secured up to a maximum of 40 m, and the maximum throughput (cumulative percentage: 95%) on the receiver side antenna was calculated. A condition with no building around is taken as "Ground", and a condition with buildings disposed as "Urban area".

It is suggested from FIG. 12 that at a distance D1 between antennas within a range of from 7 m to 15 m, a communication area which achieves a higher throughput can be formed.

Figure 13:
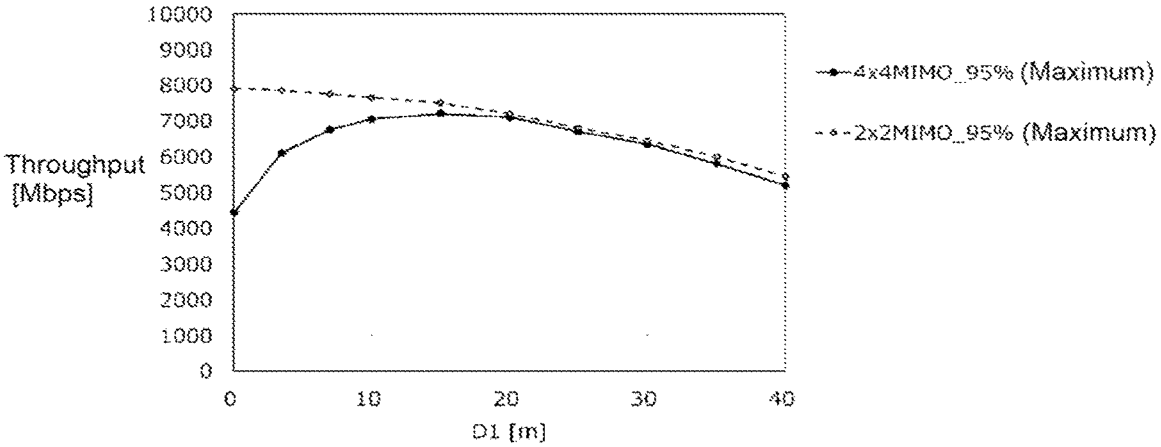
FIG. 13 is a diagram illustrating an example of throughputs calculated by simulation.

FIG. 13 is an diagram illustrating an example of throughputs calculated by simulation. The simulation illustrates a case where independent beams (frequency: 28 GHz) are transmitted from a first antenna unit 11 (1×8 element) and a second antenna unit 12 (1×8 element) by 4×4 MIMO and 2×2 MIMO. Under "Ground" conditions, the distance D1 was secured up to a maximum of 40 mm, and the maximum throughput (cumulative percentage: 95%) on the receiver side antenna was calculated.

By 4×4 MIMO, as the distance D1 between antennas increased from 0 m (a state where the first antenna unit 11 and the second antenna unit 12 are in contact with each other) to 15 m, the throughput increased. By 2×2 MIMO, as the distance D1 between antennas increased, the throughput gradually decreased. Both by 4×4 MIMO and by 2×2 MIMO, when the distance D1 between antennas was 20 m or more, the throughput gradually decreased.

This application is a continuation of PCT Application No. PCT/JP2021/030387, filed on Aug. 19, 2021, which is based upon and claims the benefit of priority from Japanese Patent Application No. 2020-139521 filed on Aug. 20, 2020. The contents of those applications are incorporated herein by reference in their entireties.

REFERENCE SYMBOLS

10: antenna set
11: first antenna unit
12: second antenna unit
20: ceiling
21 to 34: window glass
40, 41, 42, 43, 44, 45, 46, 47: building
50: road

51, 51*a*, 51*b*, 51*c*: communication area
52: beam
60: base band unit
61, 62: wiring
70: array antenna
71*a*: first antenna aperture
71*b*: second antenna aperture
72: substrate
73: radiating element
74*a*: first center line
74*b*: second center line
75: conductor
80: wireless circuit

What is claimed is:

1. An antenna set, comprising:

a plurality of antenna units comprising a first antenna unit positioned to face a window glass attached to a building, and a second antenna unit positioned at a distance from the first antenna unit such that the plurality of antenna units is configured to transmit streams by distributed MIMO, wherein the first antenna unit has a first antenna aperture and comprises a plurality of radiating elements comprising a plurality of antenna conductors and formed in the first antenna aperture, the second antenna unit has a second antenna aperture and comprises a plurality of radiating elements comprising a plurality of antenna conductors and formed in the second antenna aperture, and the first and second antenna units are formed and positioned such that a distance from a first center line of the first antenna aperture to a second center line of the second antenna aperture is more than 1.0 times an aperture width of one of the first antenna aperture and the second antenna aperture where a first direction is parallel with a horizontal plane, a second direction is perpendicular to the first direction, the aperture width is a width in the first direction, the first center line of the first antenna aperture is extending in the second direction, and the second center line of the second antenna aperture is extending in the second direction.

2. The antenna set according to claim 1, wherein the second antenna unit is positioned at the distance from the first antenna unit in a horizontal direction.

3. The antenna set according to claim 2, wherein the distance from the first center line of the first antenna aperture to second center line of the second antenna aperture is 50 m or less.

4. The antenna set according to claim 3, wherein the distance from the first center line of the first antenna aperture to the second center line of the second antenna aperture is more than 1.0 times an antenna aperture width of a wider one of the first antenna aperture and the second antenna aperture.

5. The antenna set according to claim 3, wherein the distance from the first center line of the first antenna aperture to the second center line of the second antenna aperture is in a range of 4 m to 25 m.

6. The antenna set according to claim 3, wherein the distance from the first center line of the first antenna aperture to the second center line of the second antenna aperture is in a range of 7 m to 15 m.

7. The antenna set according to claim 1, wherein the second antenna unit is positioned at the same height as the first antenna unit.

8. The antenna set according to claim 1, wherein the second antenna unit is positioned at a height different from the first antenna unit.

9. The antenna set according to claim 8, wherein the distance from the first center line of the first antenna aperture to second center line of the second antenna aperture is 50 m or less.

10. The antenna set according to claim 1, wherein the first antenna unit has a first antenna aperture, the second antenna unit has a second antenna aperture, and a lower edge of one of the first antenna aperture and the second antenna aperture is positioned above an upper edge of the other one of the first antenna aperture and the second antenna aperture.

11. The antenna set according to claim 1, wherein the second antenna unit is installed in a building different from the building in which the first antenna unit is installed.

12. The antenna set according to claim 11, wherein the second antenna unit is installed in a building facing the building in which the first antenna unit is installed.

13. The antenna set according to claim 1, wherein the second antenna unit is installed in the building in which the first antenna unit is installed.

14. The antenna set according to claim 13, wherein the second antenna unit is positioned to face the window glass which the first antenna unit faces.

15. The antenna set according to claim 1, wherein the second antenna unit is positioned to face a window glass attached to a building.

16. The antenna set according to claim 1, wherein the second antenna unit is positioned to face a window glass different from the window glass which the first antenna unit faces.

17. The antenna set according to claim 1, wherein the second antenna unit is positioned in parallel with the first antenna unit.

18. The antenna set according to claim 17, wherein the second antenna unit is positioned along the same plane as the first antenna unit.

19. The antenna set according to claim 1, wherein the distance from the first antenna unit to the window glass is in a range of 3 mm to 10 mm.

20. The antenna set according to claim 1, wherein the first antenna unit has an array antenna positioned between a wireless circuit and the window glass.

21. The antenna set according to claim 1, wherein the first antenna unit has an array antenna positioned in a region not overlapping with a wireless circuit as viewed from the front.

22. The antenna set according to claim 1, wherein the first and second antenna units are positioned such that a communication area formed by the second antenna unit has an area overlapping with a communication area formed by the first antenna unit.

23. The antenna set according to claim 1, wherein the first antenna unit comprises an array antenna comprising the plurality of radiating elements in the first antenna unit, a conductor, and a substrate positioned between the conductor and the plurality of radiating elements in the first antenna unit, and the second antenna unit comprises an array antenna comprising the plurality of radiating elements in the second antenna unit, a conductor, and a substrate positioned between the conductor and the plurality of radiating elements in the second antenna unit.

24. An antenna set, comprising:

a plurality of antenna units comprising a first antenna unit positioned to face a window glass attached to a building, and a second antenna unit positioned at a distance from the first antenna unit such that the plurality of antenna units is configured to transmit streams by distributed MIMO, wherein the first antenna unit has a first antenna aperture and comprises a plurality of radiating elements comprising a plurality of antenna conductors and formed in the first antenna aperture, the second antenna unit has a second antenna aperture and comprises a plurality of radiating elements comprising a plurality of antenna conductors and formed in the second antenna aperture, and the first and second antenna units are formed and positioned such that a distance from a first center line of the first antenna aperture to a second center line of the second antenna aperture is more than 1.0 times an aperture width of one of the first antenna aperture and the second antenna aperture where a first direction is parallel with a horizontal plane, a second direction is perpendicular to the first direction, the aperture width is a width in the first direction, the first center line of the first antenna aperture is extending in the first direction, and the second center line of the second antenna aperture is extending in the first direction.

25. The antenna set according to claim 24, wherein the second antenna unit is positioned at a height different from the first antenna unit.

26. The antenna set according to claim 25, wherein the distance from the first center line of the first antenna aperture to second center line of the second antenna aperture is 50 m or less.

27. The antenna set according to claim 24, wherein the first antenna unit has a first antenna aperture, the second antenna unit has a second antenna aperture, and a lower edge of one of the first antenna aperture and the second antenna aperture is positioned above an upper edge of the other one of the first antenna aperture and the second antenna aperture.

28. The antenna set according to claim 24, wherein the first antenna unit comprises an array antenna comprising the plurality of radiating elements in the first antenna unit, a conductor, and a substrate positioned between the conductor and the plurality of radiating elements in the first antenna unit, and the second antenna unit comprises an array antenna comprising the plurality of radiating elements in the second antenna unit, a conductor, and a substrate positioned between the conductor and the plurality of radiating elements in the second antenna unit.

29. The antenna set according to claim 24, wherein the distance from the first center line of the first antenna aperture to the second center line of the second antenna aperture is in a range of 4 m to 25 m.

30. The antenna set according to claim 24, wherein the distance from the first center line of the first antenna aperture to the second center line of the second antenna aperture is in a range of 7 m to 15 m.

* * * * *